United States Patent [19]
Kresl

[11] Patent Number: 5,197,221
[45] Date of Patent: Mar. 30, 1993

[54] VERTICALLY OSCILLATING FISHING LURE

[76] Inventor: Leon Kresl, 3902 Cass St., Omaha, Nebr. 68131

[21] Appl. No.: 557,593

[22] Filed: Jul. 25, 1990

Related U.S. Application Data

[63] Continuation-in-part of Ser. No. 385,677, Jul. 26, 1989, abandoned.

[51] Int. Cl.⁵ .............................................. A01K 85/00
[52] U.S. Cl. ................................. 43/42.47; 43/42.03; 43/42.39
[58] Field of Search ................ 43/42.47, 42.03, 42.31, 43/42.39

[56] References Cited

U.S. PATENT DOCUMENTS

| | | | |
|---|---|---|---|
| 1,320,804 | 11/1919 | Squarebriggs | 43/42.47 |
| 1,927,441 | 9/1933 | Korte | 43/42.47 |
| 1,999,522 | 4/1935 | Van Houten | 43/42.47 |
| 2,307,200 | 1/1943 | Cullerton | 43/42.47 |
| 2,496,231 | 1/1950 | Phippen | 43/42.47 |
| 2,502,879 | 4/1950 | Nikander | 43/42.47 |
| 2,550,247 | 4/1951 | Higgins | 43/42.47 |
| 2,550,704 | 5/1951 | Lizun | 43/42.47 |
| 2,561,515 | 7/1951 | Keeler | 43/42.47 |
| 2,565,099 | 8/1951 | Summons | 43/42.03 |
| 2,604,718 | 7/1952 | Crumb | 43/42.47 |
| 2,618,096 | 11/1952 | Wagner | 43/42.47 |
| 2,719,377 | 10/1955 | Bennett | 43/42.47 |
| 2,737,751 | 3/1956 | Munsch | 43/42.47 |
| 4,054,004 | 10/1977 | Schott | 43/42.09 |
| 4,245,421 | 1/1981 | Phillips | 43/42.47 |

FOREIGN PATENT DOCUMENTS 932938 1/1956 Fed. Rep. of Germany .......... 43/42

Primary Examiner—Kurt C. Rowan
Attorney, Agent, or Firm—John A. Beehner

[57] ABSTRACT

A vertically oscillating fishing lure has an elongated lure body with a transversely extended wing secured to the body in position such that a substantial portion of the wing is positioned longitudinally forwardly of the center of gravity of the lure. A hook is pivotally secured to the lure body adjacent the rearward end thereof and an attachment eye is secured at the forward end at a vertical position no lower than the lowest portion of the wing whereby a vertically oscillating generally sine wave action is imparted to the lure in response to forward advancement to the water by a line attached to the eye.

20 Claims, 3 Drawing Sheets

VERTICALLY OSCILLATING FISHING LURE

CROSS REFERENCE TO RELATED APPLICATION

This patent application is a continuation-in-part of U.S. patent application Ser. No. 385,677, filed on Jul. 26, 1989, now abandoned.

BACKGROUND

The present invention is directed generally to a fishing lure and more particularly to a vertically oscillating fishing lure having a wing shaped planing surface to impart a somewhat sine wave action to the lure as it is advanced through the water.

Fishing lures are commercially available in many sizes, shapes and designs for catching various types of fish. Some float, some sink, some wiggle, and spin. It is believed that the action of the lure is directly related to the attraction that lure has to certain types of fish.

The particular design of the fishing lure of the invention imparts a vertically oscillating sine wave type motion that is not heretofore known to be characteristic of any commercially available lures. This motion does, however, simulate the natural movement of certain bait fish. The prototype lures of the present invention have been shown to be operative for catching such fish as bass and northern pike.

Accordingly, a primary object of the invention is to provide an improved fishing lure.

Another object is to provide a fishing lure which vertically oscillates in a sine wave type motion when it is advanced through the water.

Another object is to provide a fishing lure which is attractive to fish and effective for catching them.

Another object is to provide an improved fishing lure which is simple and rugged in construction, economically manufactured and efficient in operation.

SUMMARY OF THE INVENTION

The vertically oscillating fishing lure of the present invention includes an elongated lure body and a transversely extended wing secured to the body and centered thereon. A treble hook is pivotally secured to the rearward end of the lure body and a second treble hook may be pivotally secured to the underside of the body.

The wing is positioned relative to the body such that a substantial portion of the wing is positioned longitudinally forwardly of the center gravity of the lure. Furthermore, the eye for attaching the fishing lure to a line is secured to the lure body adjacent the forward end at a vertical position no lower than the lowest portion of said wing.

It is the combination of the location of the line eye relative to the wing and the location of the lure's center of gravity to the wing that give the lure its unique vertical oscillating action. Generally, any of the wing behind the point where the line eye is attached to the body gives the lure its oscillating action, whereas any of the wing or a scoop attached ahead of where the line eye attaches to the body largely contribute to the lure's diving action.

To further define those features which contribute to this vertical oscillating motion of the lure, the wing is situated relative to the lure body such that seventy percent (70%) of the total wing area is situated longitudinally forwardly of a transverse vertical plane through the lure body spaced rearwardly from the forward end of the lure body by a distance equal to forty percent (40%) of the length of the lure body.

Likewise, up to thirty percent (30%) of the total wing area may be located longitudinally forwardly of the eye where the line is attached or forwardly of the uppermost point of attachment of the eye to the lure body. Stated in reverse, at least seventy percent (70%) of the total wing area should be located longitudinally behind the eye.

Many other design features of the lure such as the wing dihedral, wing or foil, wing angle of attack, and lure body cross-sectional shape may be varied to alter the motion of the lure, as desired.

DESCRIPTION OF THE PREFERRED EMBODIMENT

Figure 1:
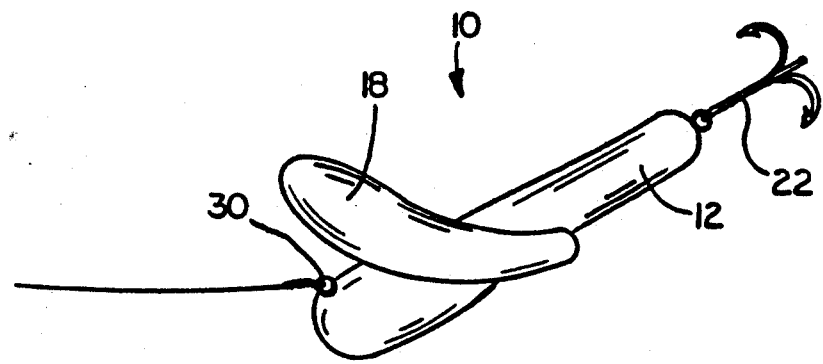
FIG. 1 is a perspective view of the fishing lure of the invention.

The vertically oscillating fishing lure 10 of the present invention is illustrated in the drawings as including an elongated lure body 12 having forward and rearward ends 14 and 16 and a transversely extended wing 18 secured to the lure body 12. The wing is preferably transversely centered on the lure body and rigidly secured thereto by any suitable fastening means. A substantial portion of the wing is positioned longitudinally forwardly of the center of gravity, indicated at 20, of the lure.

A treble hook 22 is pivotally connected to the lure body 12 adjacent the rearward end 16, such as by eyelet 24. A second treble hook 26 may be secured to the underside of the lure body by a second eyelet 28.

Figure 4:
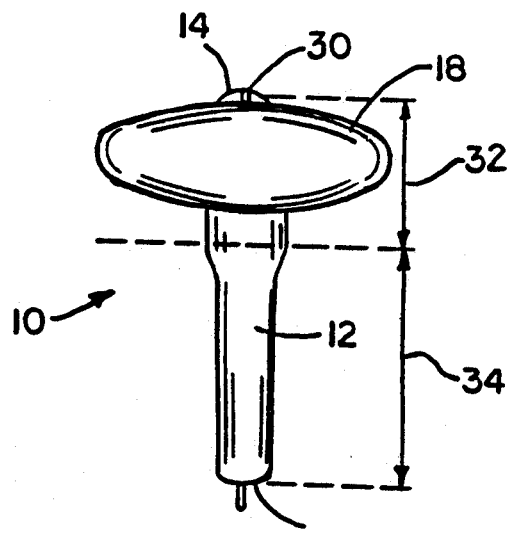
FIG. 4 is a top plan view of the invention.
Figure 5:
FIG. 5 through 8 show alternate wing shapes for the invention.
Figure 6:
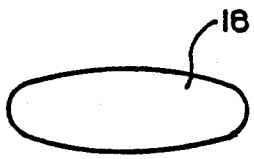
Figure 7:
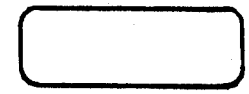
Figure 8:
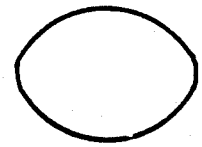

The cross-sectional shape of the lure body is not critical to the present invention. A round or upright oval shape, or a combination thereof, is operative for the lure. The top surface of the lure may be flat in the area of engagement with the wing for a secure connection therebetween. Looking down from the top, as in FIG. 4, it is preferred that the tail of the lure be thin. In the side view of FIG. 2, the tail, that portion adjacent rearward end 16, may be quite tall. It is preferred that the transverse width of the tail be narrower than the width of the forward portion of the lure so as not to impede the action of the lure.

The body of the lure may be painted to resemble bait fish or other colors for attracting fish. The wing is preferably made of a substantially transparent or clear plastic so that it is substantially invisible to fish. Alternately, the wing could be painted in a manner determined most attractive to fish.

The position of the wing contributes to the novel vertically oscillating action of the lure. Referring to the top view of FIG. 4, up to thirty percent (30%) of the total wing area may be located ahead of the line attachment eye 30, without regard to relative vertical positions. Stated in reverse, at least seventy percent (70%) of the total wing area must be located longitudinally rearwardly of the line attachment eye 30. The above statements apply to any lure having the eye secured thereto closely adjacent the lure body or fixedly secured in spaced relation from the lure body. For a pivotally or movably attached eye, those statements should be revised to recite that thirty percent (30%) of the total wing area may be located ahead of the eye attachment point or that at least seventy percent (70%) of the total wing area must be located longitudinally rearwardly of the eye attachment point. The "eye attachment point" is defined as the uppermost point of engagement between the lure body and any stem which movably connects the eye to the lure body.

Alternately, the wing 18 is situated relative to the lure body 12 such that at least seventy percent (70%) of the total wing area, as viewed from the top, is disposed forwardly of a transverse vertical plane through the lure body 12, which plane is positioned rearwardly of the forward end 14 of the lure body by a distance equal to forty percent (40%) of the length of the lure body, arrows 32 and 34 corresponding respectively to forty percent (40%) and sixty percent (60%) of the length of the lure body. In this analysis, the lure body is not intended to include any front scoop, diving plane or other operative which would otherwise extend the length thereof. For such lures, the length of the lure body could be construed as including only that portion behind where the line eye is attached to the lure body.

Figure 13:
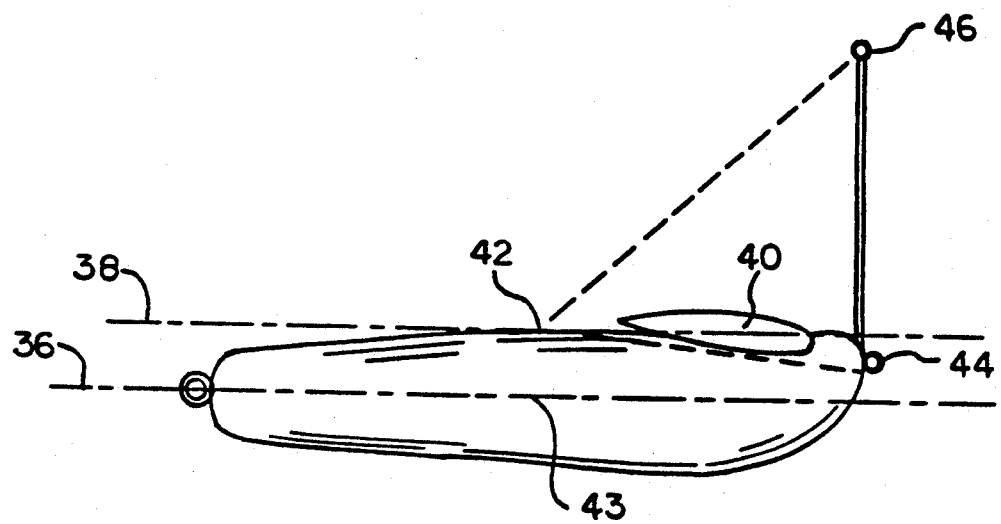
FIG. 13 is a side elevational view indicating varying positions for the eye of the lure.

Another important consideration is the relative vertical position of the line attachment eye 30. As indicated in FIG. 13, the eye should be vertically positioned no lower than the lowest portion of the wing 18. Accordingly, the entire exposed portion of eye 30 is situated above a horizontal plane intersecting the lowest portion of the wing 18.

The following describes the eye position from a different point of reference. In FIG. 13, a center line 36 is drawn horizontally through the center of the area of the lure body 12 as viewed from the side. Another line 38 is drawn parallel to line 36 and through a point 40 at the center of the cross sectional area of the wing, said section being taken along a vertical longitudinal plane through the transverse center of the wing. Then, using a point 42 on line 38 perpendicular to the longitudinal center 43 of the lure body 12, the line eye 30 may be positioned so as to be bisected by a line extending from point 42 and sloped at an angle of between ten degrees below line 38 as indicated in dotted lines at 44, and 45 degrees above line 38, as indicated in solid lines at 46. This is the preferred range for a lure that tends to go deeper into the water when pulled through the water by a fishing line attached to eye 30. For a lure that will tend to rise toward the surface, the line eye 30 should be located at a position to be bisected by a line from point 42 sloped at an angle of between plus ten degrees above line 38 to minus 20 degrees below line 38.

Most other features of the lure are variable without impairing the vertical oscillating action thereof. For example, the wing shape may vary according to any of the shapes indicated in FIGS. 5 through 8. Those shapes are viewed from the top with the forward edge of the wing at the top of the figure. In each instance, the leading or forward edge slopes or curves rearwardly and outwardly so that the lure 10 will be less likely to get caught in weeds or other obstructions.

The wing may be constructed of almost any material of adequate strength but the previously mentioned substantially transparent plastic is preferred.

Figure 3:
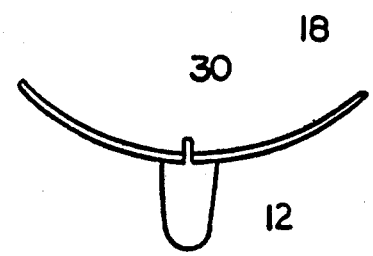
FIG. 3 is a front elevational view of the lure of the invention.
Figure 9:
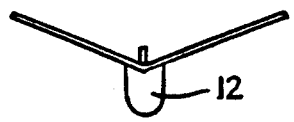
FIG. 9 is a front view of a further embodiment of the invention having angled linear wings.

Wing dihedral can be designed in conjunction with the center of gravity of the lure to add stability to the lure. Dihedral is the slope of the wing relative to the horizontal when viewed from the front as in FIGS. 3 and 9. A lure without positive dihedral, but with a low center of gravity, is expected to vertically oscillate in the water, but a wing dihedral of between ten and thirty degrees is preferred. A wing with a dihedral greater than thirty degrees is likewise expected to vertically oscillate, but excessive dihedral is not necessary. The dihedral can be either constant for the length of the wing as indicated in FIG. 9 or rounded for the length of the wing as illustrated in FIG. 3.

The wing airfoil likewise may be varied, as desired. A neutral airfoil has worked well on tested prototypes. It is anticipated that the wing can be designed with an airfoil that will provide negative lift to help keep the lure running deeper in the water.

Figure 10:
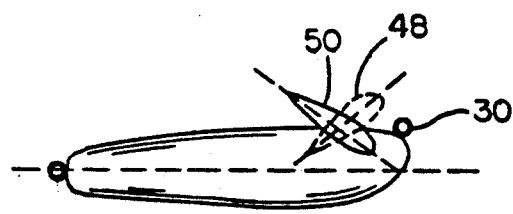
FIG. 10 is a side elevational view illustrating the range of variance of the angle of attack of the center of the wing.

Referring to FIG. 10, the angle of attach of wing 18 can vary from a plus forty degrees as indicated in dotted lines at 48 to a minus 40 degrees as indicated in solid lines at 50 in FIG. 10. A positive angle of attack would make the lure rise toward the surface of the water. Tests indicate that an angle of attack less than twenty degrees will work best.

Various alterations may be made to the lure body. For example, the lure 10 is primarily designed to be a lure that sinks in the water and is then retrieved. A specific gravity of the overall lure is thus greater than that of water. An alternate embodiment can provide the lure as a floating lure that oscillates above and below the surface of the water. When the sinking version is retrieved rapidly near the surface of the water, it will, on occasion, jump out of the water and then resume oscillating under the water.

Figure 11:
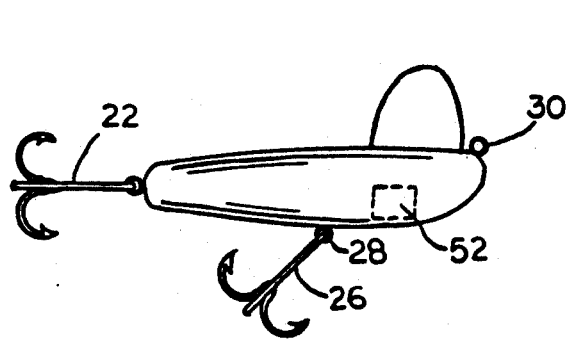
FIG. 11 illustrates a weighted insert secured within the lure body.

The lure body 12 may contain a weighted insert 52, as illustrated in FIG. 11, to help situate the center of gravity of the lure at a desired low position on the lure body. Since the lure has no downward planing surface, the additional weight will also help it sink faster so the lure can be retrieved from the depth where the fish are. The added weight should result in a better looking and possibly acting lure. The lure could be designed to work well without the weight by distributing the mass of the lure body and resulting weight near the front of the lure.

The ideal location for the center of gravity of the overall lure 10 appears to be below and rearwardly of the trailing edge of the wing 18. As the center of gravity gets further behind the trailing edge of the wing 18, the lure will still oscillate to a degree, but the lure will then swim With an up and down motion of the tail, much as a porpoise swims while vertically oscillating to a lesser degree. The center of gravity is preferably determined under water, perhaps more accurately referred to as the center of flotation or center of buoyancy, namely that point around which the lure's mass or weight is evenly distributed or balanced and through which the buoyant force of the water acts. Voids, air spaces, foam or other material lighter than water could also be incorporated into the lure to adjust its center of buoyancy.

Figure 12:
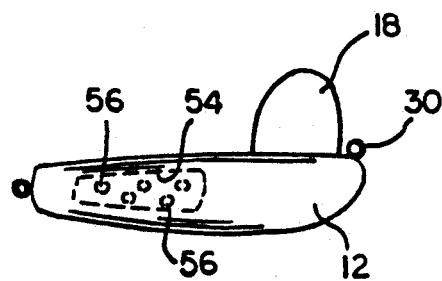
FIG. 12 illustrates a further embodiment including a rattle feature.

As a further alternative, the lure body 12 may be formed with a hollow chamber 54 therein as illustrated in FIG. 12 and small hard rattles 56 may be disposed within the chamber for making noise in response to movement of the lure body in the water.

Figure 14:
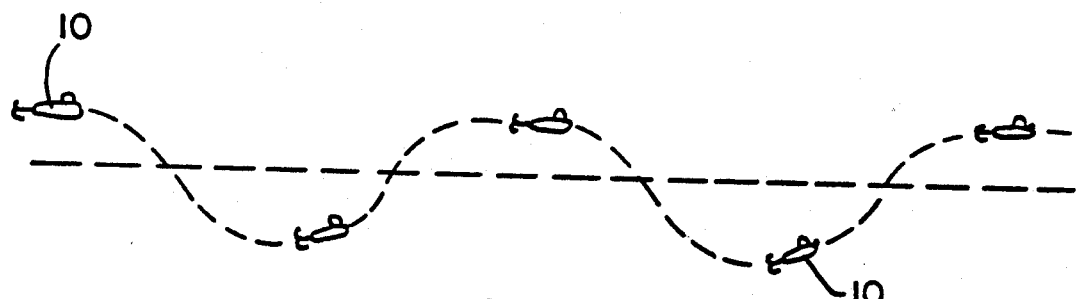
FIG. 14 is a side diagrammatic view of the sine wave oscillating action of the lure in operation.

When the lure is advanced in the water in response to pulling of a line attached to the line eye 30, by being reeled in or by other methods such as trolling, the lure advances with an up and down generally sine wave motion. The entire lure oscillates above and below an axis, as indicated diagrammatically in FIG. 14, rather than just the tail of the lure vibrating up and down.

Some test models of the lure appear to oscillate as much as three inches above and below an axis. This may not be the maximum that can be achieved, but it appears to be an effective working degree of oscillation. Although the tail of the lure moves up and down as the lure advances through the water, it does not do so rapidly as, for example, the side to side vibration of a floating Rapala lure.

Figure 2:
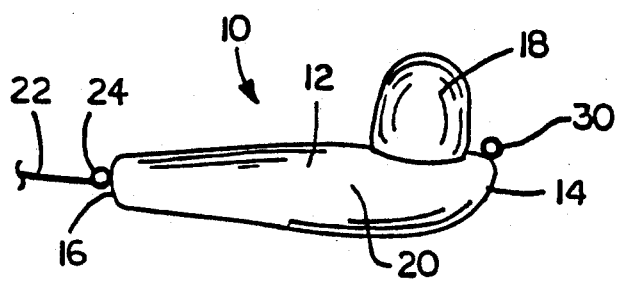
FIG. 2 is a side elevational view of the invention.
Figure 15:
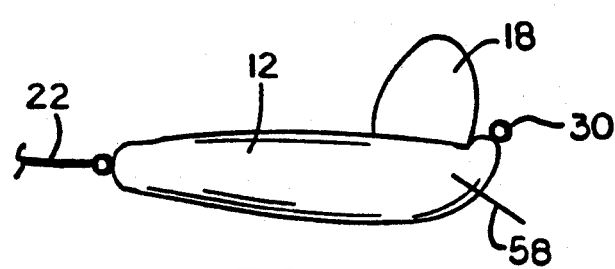
FIG. 15 is a side elevational view of an alternate embodiment of the invention including a front scoop.

FIG. 15 illustrates a variation of the lure of FIG. 2 by adding a generally flat forwardly extending front scoop 58. The front scoop may impair the vertically oscillating movement but is not expected to eliminate it.

Whereas the lure of the invention has been illustrated and described in connection with preferred embodiments thereof, it is understood that many modifications, additions and substitutions may be made which are within the intended broad scope of the appended claims.

Thus there has been shown and described a vertically oscillating fishing lure which accomplishes at least all of the stated objects.

I claim:

1. A vertically oscillating fishing lure adapted for connection to a fishing line, comprising,
   an elongated lure body having forward and rearward ends,
   a transversely extended wing secured to said body, said wing being generally transversely centered relative to said lure body and a substantial portion of said wing being positioned longitudinally forwardly of the center of gravity of said lure,
   hook means pivotally secured to said lure body, and
   an attachment eye secured to said lure body adjacent the forward end thereof,
   said wing being positioned such that at least seventy percent (70%) of the total wing area is located longitudinally rearwardly of the attachment eye, and said wing having an angle of attack within a range from plus forty degrees to minus forty degrees,
   the position of the attachment eye relative to the wing, the wing angle of attack, and the position of the wing relative to the center of gravity being combined such that a vertically oscillating generally sine wave action is imparted to the lure in response to forward advancement through the water by a line attached to said eye.

2. The fishing lure of claim 1 wherein said wing is situated relative to the lure body such that at least seventy percent (70%) of the total wing area is disposed forwardly of a transverse vertical plane through the lure body said plane being positioned rearwardly of the forward end of the lure body by a distance equal to forty percent (40%) of the length of the lure body.

3. The fishing lure of claim 1 wherein the center of gravity of said lure is longitudinally positioned adjacent the rearward edge of said wing.

4. The fishing lure of claim 1 wherein said attachment eye is vertically positioned in spaced relation above a longitudinal center line through said lure body.

5. The fishing lure of claim 1 wherein said wing has a forward edge and trailing edge and said forward edge is sloped rearwardly and outwardly from said lure body whereby said lure is less likely to catch on weeds and the like.

6. The fishing lure of claim 5 wherein said wing is formed of a substantially transparent plastic material.

7. The fishing lure of claim 5 wherein said wing has a positive dihedral to stabilize the lure and prevent side to side action.

8. The fishing lure of claim 5 wherein said wing has an airfoil of a type selected from the group consisting of positive, neutral and negative.

9. The fishing lure of claim 5 wherein said wing has a negative angle of attack.

10. The fishing lure of claim 5 wherein said wing has a positive angle of attack.

11. The fishing lure of claim 5 further comprising a second hook means pivotally secured to said lure body at a longitudinal position between the forward and rearward ends thereof.

12. The fishing lure of claim 1 wherein said lure is free of a front scoop operative to cause the lure to dive.

13. The fishing lure of claim 1 wherein said elongated lure body further includes a weighted insert secured thereto to adjust the center of gravity thereof.

14. The fishing lure of claim 1 wherein said lure body includes a hollow chamber and rattles disposed within said chamber for making noise in response to movement of said lure body.

15. The fishing lure of claim 1 wherein said hook means is secured to said lure body adjacent the rearward end thereof.

16. The fishing lure of claim 15 further comprising a second hook means pivotally connected to said lure body at a position forwardly of said aforementioned hook means.

17. A vertically oscillating fishing lure adapted for connection to a fishing line, comprising,
   an elongated lure body having forward and rearward ends,
   a transversely extended wing secured to said body, said wing being generally transversely centered relative to said lure body and a substantial portion of said wing being positioned longitudinally forwardly of the center of flotation of said lure.
   hook means pivotally secured to said lure body,
   an attachment eye,
   stem means connected to and extending between said attachment eye and lure body and defining an eye attachment point at the uppermost point of engagement of said lure body and stem means,
   said eye attachment point being positioned adjacent the forward end of said lure body,
   said wing being positioned such that at least seventy percent (70%) of the total wing area is located longitudinally rearwardly of the eye attachment point, and said wing having an angle of attack within a range from plus forty degrees to minus forty degrees, the position of the attachment eye relative to the wing, the wing angle of attack, and the position of the wing relative to the center of flotation being combined such that a vertically oscillating generally sine wave action is imparted to the lure in response to forward advancement through the water by a line attached to said eye.

18. The fishing lure of claim 17 wherein said wing is situated relative to the lure body such that at least seventy percent (70%) of the total wing area is disposed forwardly of a transverse vertical plane through the lure body, said plane being positioned rearwardly of the forward end of the lure body by a distance equal to forty percent (40%) of the length of the lure body.

19. A vertically oscillating fishing lure adapted for connection to a fishing line, comprising, an elongated lure body having forward and rearward ends, a transversely extended wing secured to said body, said wing being generally transversely centered relative to said lure body and a substantial portion of said wing being positioned longitudinally forwardly of the center of buoyancy of said lure, hook means pivotally secured to said lure body, and an attachment eye secured to said lure body adjacent the forward end thereof, said wing being positioned such that at least seventy percent (70%) of the total wing area is located longitudinally rearwardly of the attachment eye, and said wing having an angle of attack, within a range from plus forty degrees to minus forty degrees, the position of the attachment eye relative to the wing, the wing angle of attack, and the position of the wing relative to the center of buoyancy being combined such that a vertically oscillating generally sine wave action is imparted to the lure in response to forward advancement through the water by a line attached to said eye.

20. The fishing lure of claim 1 wherein said attachment eye is vertically positioned and no lower than the lowest portion of said wing.

* * * * *